UNITED STATES PATENT OFFICE.

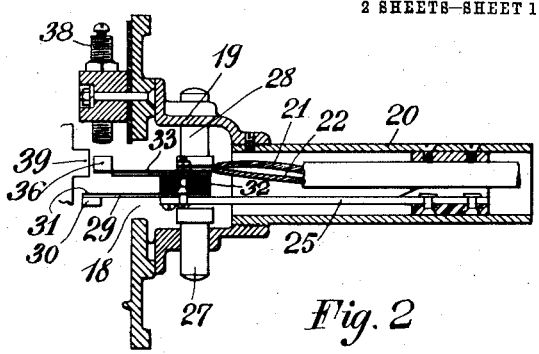
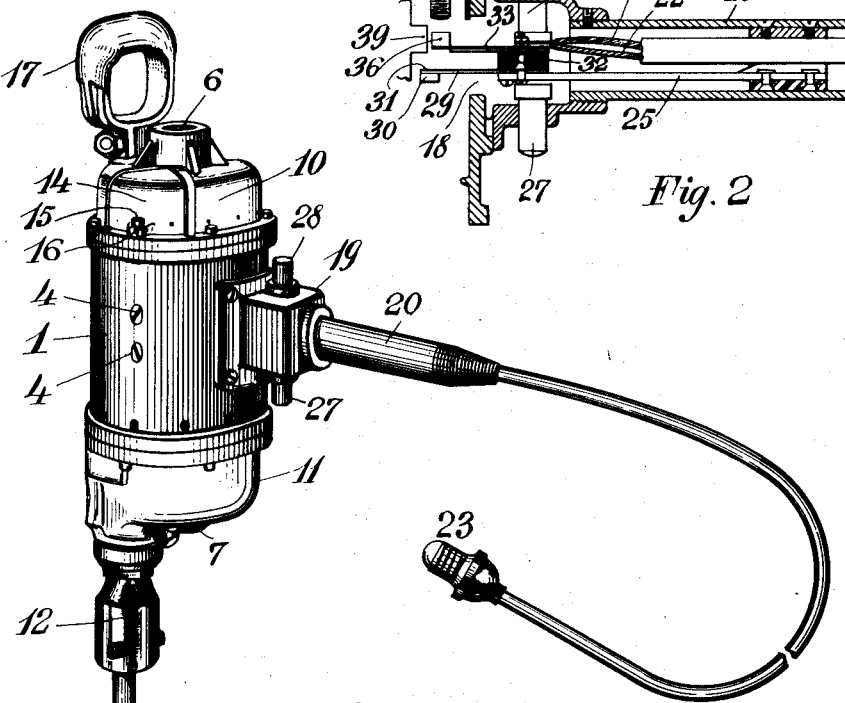
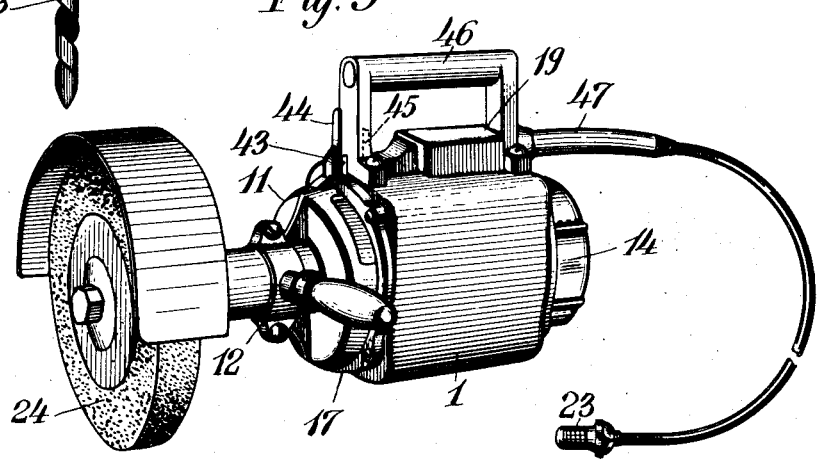

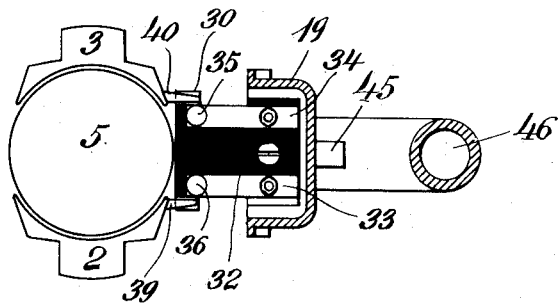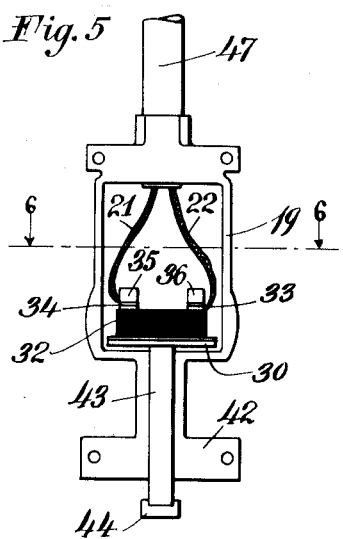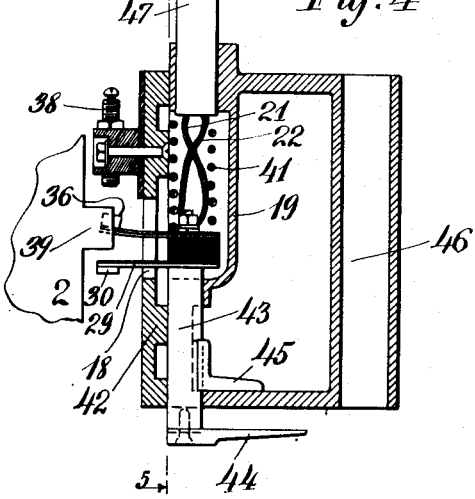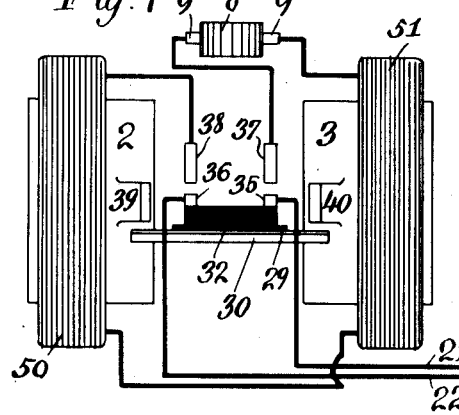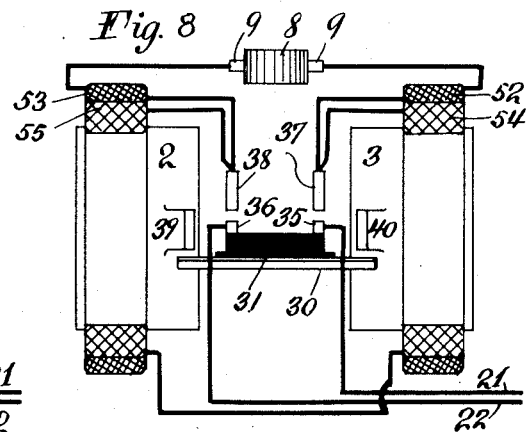

ELIE F. G. H. FAURE, OF ERIE, PENNSYLVANIA, ASSIGNOR TO BURKE ELECTRIC COMPANY, A CORPORATION OF PENNSYLVANIA.

CONTROLLING DEVICE FOR ELECTRICAL APPARATUS.

979,143.  Specification of Letters Patent.  Patented Dec. 20, 1910.

Application filed January 31, 1910. Serial No. 540,983.

*To all whom it may concern:*

Be it known that I, ELIE F. G. H. FAURE, a citizen of the Republic of France, residing at Erie, in the county of Erie and State of Pennsylvania, have invented certain new and useful Improvements in Controlling Devices for Electrical Apparatus, of which the following is a full, clear, and exact specification.

This invention relates to controlling devices for electrical apparatus.

More specifically this invention relates to controlling devices for electrical apparatus particularly of the portable type.

It has been common experience with portable electrical tools and appliances that the leads running from fixed mains to the tool or appliance are subject to considerable wear and breakage, and are the chief cause of trouble, delay and expense. In constructions of the prior art the leads are run to contacts to which they are fastened by screws or the like, the several parts requiring proper preparation, fitting and assembling to give good electrical connection; hence when it is desired to change the leads in said prior devices, the services of a skilled electrician are required, causing considerable expense in services and keeping the tool or appliance out of use until repaired.

It is the object of my invention to devise a controlling means which may be most readily mounted in position on the electrical tool or appliance, and also most readily dismounted, the operations of mounting and dismounting involving mere mechanical manipulation, and hence capable of being quickly accomplished by even unskilled labor.

My invention may be described as applied to portable, electric motor driven tools, such as drills, grinders, and the like.

In general, my controller is constructed and arranged so as to be applied as a unit to the tool or appliance by mere mechanical manipulation, involving only the use of screws, bolts, clips, or the like.

Essentially my controller embodies a resilient switch member carrying movable contacts adapted to be brought in electrical connection with contacts fixed on the tool or appliance, said member further carrying a magnetic armature which coacts with subsidiary pole pieces disposed on the field element of the motor of the tool or appliance, so that upon manually moving said switch member to bring the movable contacts in electrical connection with the fixed contacts to close the circuit, the field of the motor is energized, and the magnetic armature retains the contact elements in engagement, thus relieving the operator of any effort required in holding the contact elements in closed-circuit position. Furthermore, when the circuit is broken by any cause, or no-voltage exists in the supply circuit, the magnetic armature is released, effecting an opening of the electrical connection of the tool or appliance with the supply circuit.

In the preferred forms of my invention, my controller embodies a handle for holding the tool or appliance, and means for supporting the cable carrying the leads which run to the movable contacts. In the various forms of my invention the line of movement of the contact elements in opening the circuit is disposed in a direction transverse, preferably at right angles, to the lines of force of the magnetic field of the tool or appliance, or a portion of said field, whereby the magnetism of the motor is utilized to blow out arcs which may be formed upon opening of the circuit.

Other objects and features of my invention will be understood from the following description and the accompanying drawings, in which—

Figure 1 is a perspective view of a drill provided with one form of my invention; Fig. 2 is a central longitudinal section of my controller shown in Fig. 1; Fig. 3 is a perspective view of a grinder embodying a second form of my invention; Fig. 4 is a vertical central section of the handle or switch plate, a part of the motor yoke and a fragment of a motor pole-piece being shown; Fig. 5 is a section on the line 5—5 of Fig. 4 looking in the direction of the arrow; Fig. 6 is a section on the line 6—6 of Fig. 5 looking in the direction of the arrow, the motor armature and pole-pieces being shown in top plan; Fig. 7 is a diagram showing the connections of the series motor windings, the fixed contacts, and the switching mechanism, and Fig. 8 is a diagram similar to Fig. 7, showing the connections of the switching mechanism, fixed contacts and series and shunt motor windings.

Referring to the drawings, the apparatus comprises a motor field yoke 1, of iron, steel or any suitable magnetic material. To this yoke are secured the pole-pieces 2 and 3 by means of screws 4, which pass through the yoke and enter into the pole-pieces in a well known manner. These pole-pieces may be of iron or steel, and may be constructed solid or laminated, or partially solid and partially laminated, as is indicated by the requirements of the conditions of operation, as is well understood. Within the pole-pieces rotates an armature 5, having its shaft vertically disposed in bearings 6 and 7. The armature is shown as of the direct current type, and comprising a commutator 8 and brushes 9. Upon the pole-pieces 2 and 3 are mounted the field coils, as will be described more fully hereinafter. Bearings 6 and 7 are carried by aluminum heads 10 and 11, which are secured to the field yoke at its ends. Within the head 11 is mounted gearing whereby power is transmitted to the tool shaft carrying the chuck 12, and proper relation of the tool speed to that of the motor is secured. These gears may be of usual construction, and therefore need no illustration or description. A drill 13 is shown in Fig. 1 secured to the chuck 12; Fig. 2 illustrates a grinding wheel 24 coupled to the chuck 12. The head 10 is provided with a removable section 14 which is held in place by a screw 15, engaging with a lug 16 and screwing into the field yoke. This removable section permits ready access to the commutator and brushes. A handle 17 is fixed to the head 10 to facilitate the manipulation of the apparatus.

In the yoke 1 is a hole 18 adapted to be closed by an aluminum plate or box 19, which is bolted to the yoke. This plate or box serves not only as a plate to cover the hole and to secure the handle and cable supporting and protecting means to the apparatus, but it also serves as a box for the reception of the controller or switch parts. At one end of the switch box is an opening through which a cable containing the conductors or leads 21 and 22 enters. The cable is packed at the point of entry so as to make a tight joint to give proper support, and a tube is secured to the box 19 to give further support to the cable. The cable outside may extend to an attaching plug 23, whereby connection of the leads to a suitable source may be effected.

In the form of my controller shown in Figs. 1 and 2, the tube 20 is secured to the switch box 19 at right angles to the axis of the armature shaft, that is, the tube 20 extends horizontally from the box 19 when the drill is held vertically, the operator grasping the handle 17 and the tube 20 when performing work with the device. Within the tube 20, and insulated therefrom, is mounted, a resilient strip 25 carrying a brass plate 29, to the outer end of which is secured an iron bar or plate 30. Upon the top of the brass plate 29 is a sheet 31 of mica, or other suitable insulating material, and upon the sheet 31 at one end is secured a block 32 of fiber, or the like, upon which block 32 are secured conducting strips 33, 34, preferably of resilient material, which strips extend through the hole 18 in the motor casing and carry at their extremities contacts 35 and 36 which are adapted to engage respectively with the stationary contacts 37 and 38, the latter being mounted upon the inside of the motor yoke, but insulated therefrom, and connected to the motor circuit. The strips 33 and 34 are, of course, insulated from each other and are respectively connected to the leads 21 and 22. The push button 27 is disposed in a hole on the lower side of the switch box 19, which when pressed upwardly strikes the brass plate 29, causing the movable contacts 35 and 36 to come into engagement with the stationary contacts 37 and 38. A similar push button 28 is disposed in a hole on the upper side of the switch box 19 which when pushed downwardly strikes the block 32, thereby effecting a separation of the movable contacts from the stationary contacts, and opening the circuit connections of the motor with the supply circuit.

The controller of the form illustrated in Figs. 3, 4, 5 and 6 is constructed and arranged in manner similar to the form just described, differing, however, in certain mechanical details. In this form the box 19 is provided with a hollow extension 42 for housing the plunger rod 43 provided with finger pieces 44, 45, the former for pushing the plunger upwardly, and the latter for pushing the plunger downwardly. A handle 46 is secured to the upper end of the box 19 and to the lower end of the extension 42. The tube 47 for supporting and protecting the cable enters the switch box 19 at its upper end. Upon the upper end of the plunger 43 is secured a brass plate 29, carrying an iron bar or plate 30, a sheet 31, block 32, resilient strips 33, 34 and contacts 35, 36, each being similar to corresponding parts in the first described form of my invention.

A projection 39 is formed upon one of the pole pieces, and a similar projection 40 is formed upon the other pole-piece. These projections are, of course, of magnetic material, and it will be understood that although the motor is illustrated as having but two pole-pieces, the invention is applicable to a multipolar machine. The iron bar 30 is positioned a short distance below the projections 39 and 40, and in the magnetic field between said projections 39 and 40, thus being disposed in an interpolar space.

In Figs. 7 and 8, I illustrate two arrangements of the electrical connections of the stationary contacts 37 and 38 with the field coils and the armature of the motor, the first showing a series arrangement, and the second showing a combined series and shunt connection. The particular electrical arrangement will be determined by the character of work to be performed by the tool or appliance, as will be understood by those skilled in the art. Referring to Fig. 7, the stationary contact 38 is connected to one terminal of the field coil 50, the other terminal of that field coil being connected with a terminal of the field coil 51, the other terminal of the field coil 51 being connected with one of the brushes 9, the other brush being in electrical connection with the stationary contact 37. In the arrangement illustrated in Fig. 8, the contact 37 is connected to one terminal of the series coil 52 of relatively large wire, the other terminal of this coil being connected to one of the brushes 9. The contact 38 is connected in a like manner to one terminal of the series coil 53, similar to coil 52, the remaining terminal of coil 53 being connected to the other brush 9. The contact 37 is also connected to one terminal of the shunt coil 54, of relatively fine wire, and the contact 38 is connected in a like manner to one terminal of the shunt coil 55, similar to coil 54, the remaining terminals of the coils 54 and 55 being connected with each other.

As above indicated, the movable contacts 35 and 36 are respectively connected to the line conductors 21 and 22. With the parts in the position as shown in the drawings, it is apparent that the movable contacts are not in engagement with the stationary contacts, and thereupon the leads are disconnected from the motor circuit. If, however, the strip 25, in the first case, or the plunger 43, in the second case, is pressed upwardly, as by pressing the button 27 or finger-piece 44, respectively, upwardly, the contacts 35 and 36 will come into engagement with the stationary contacts 37 and 38, and circuit can then be traced from one of the leads 21 through the motor fields and armature to the other lead 22. The contacts 37 and 38 are fixed on the motor yoke, so that when the strip 25, or the plunger 43, is moved upwardly to the limit of its movement, the springs 33 and 34 will be pressed downwardly and a tension created, thereby tending to force the movable contacts and the parts supporting the same downwardly. In the first form of my invention, the resiliency of the strip 25, or of the spring 41, in the second form, assists further in giving a bias to the movable contacts 35 and 36 in a downward direction, that is, away from the stationary contacts 37 and 38. If now it is desired to stop the motor, a downward pressure may be exerted on the button 28, in the one case, or the finger-piece 45, in the second case, whereupon the contacts 35 and 36 will be separated from the stationary contacts 37 and 38, and cutting off the motor from the supply circuit. If, while the contacts are in closed position, and the motor is running, the source of supply should be cut off for any cause, or no-voltage exist on the line, the magnetism in the motor will be destroyed, and the attraction upon the bar 30 will cease, whereupon the resiliency of the strip 25, in the one case, or the tension of the spring 41, in the other case, will cause the contacts 35 and 36 to be moved into their lower position. The switch mechanism thus serves the purpose of a no-load or no-voltage circuit-breaker, and it will be seen that after the power has once been cut off, the motor cannot again be started without the operation of re-closing the contacts. It will be noted that the contacts are located in such proximity to the field of the motor, that any arcs which may be drawn between them on opening, will extend at right angles to the lines of magnetic force of the motor field and within the influence thereof, and hence will be immediately blown out.

The handle and electrical controlling parts, it will be seen, are mounted on the tool by mere mechanical manipulation, and can be quickly performed even by labor unskilled in making electrical connections and fittings. In practice, I find it advantageous to make the switch parts, the cable support and handle, and the cable as a unit and of standard form, thus permitting quick dismounting of worn out or defective units, and the replacing of new units. It will further be seen that my invention possesses the valuable feature of requiring an appreciable effort to open the circuit, thus discouraging the operator from trifling or toying with the switch mechanism.

It will be understood that my controlling means may be applied to any electrical apparatus whether portable or not, and whether an electromagnetic field is utilized in the operation of the apparatus or not, since in the last named case, an electro-magnet specifically for co-acting with the magnetic armature of my controller may be provided.

Whereas I have illustrated my invention in what I consider its best forms, I do not desire my invention to be limited to the same, since the different forms shown and described are capable of various changes or modifications within the scope of my invention.

Having thus described my invention I declare that what I claim as new and desire to secure by Letters Patent, is—

1. The combination of a portable electric device having an electromagnetic field element, a handle for said device, a movable switch element disposed in said handle, a fixed contact on said device coöperating with said movable switch element, and means controlled by said electromagnetic field element for maintaining said movable switch element in closed position.

2. The combination with a rotary electric motor, of a switch for controlling the same, the contacts of said switch being arranged in proximity to said motor so that arcs formed at said contacts will be blown out by magnetism of said motor.

3. The combination with a rotary electric motor of a switch for controlling the same, said switch being controlled by the magnetism of said motor and the contacts of said switch being arranged so that arcs formed at said contacts will be blown out by magnetism of said motor.

4. The combination of a portable electric device having an electromagnetic field element, a handle for said device, a movable switch element disposed in said handle, fixed contact terminals connected to the field circuit of said device and disposed on said device adjacent said handle, means actuated by the field of said electric device for maintaining said movable switch element in closed position, and manually operated means for moving said switch element to closed and open positions.

5. The combination with an electric motor of a switch for controlling the same and a magnetic armature extending within an interpolar space of said motor said armature controlling said switch and being within the influence of magnetism of said motor, the contacts of said switch being within an interpolar space of said motor and in such proximity thereto that arcs formed at said contacts will be blown out by magnetism of said motor.

6. The combination of a portable electric device having an electromagnetic field element, a handle for said device, a movable magnetic device mounted in said handle, fixed terminals on said electric device, a movable switch element in said handle and coöperating with said fixed terminals, means whereby the movement of said magnetic device is communicated to said movable switch element, and means controlled by the magnetism of said electric device for maintaining said movable magnetic device in a certain position.

7. The combination with an electric device having an electromagnetic field element, a handle for said device, a fixed contact on said device, a movable switch element disposed in said handle coöperating with said fixed contact, means controlled by said electromagnetic field element for maintaining said switch element in closed circuit position, and manual means for moving said switch element to open and closed positions.

8. The combination with an electric motor of contacts mounted thereon to which the motor circuit is connected, a removable switch box secured to said motor, contacts secured in said switch box and adapted to engage the aforesaid contacts when the parts are assembled and supply leads connected with the contacts in said switch box.

9. The combination with an electric motor of contacts mounted thereon to which the motor circuit is connected, a removable switch box secured to said motor, contacts mounted in said switch box, supply leads connected with the contacts in said switch box, the contacts in said switch box being adapted to engage with the contacts mounted upon the motor when the parts are assembled, and means mounted upon the switch box for controlling the contacts.

10. The combination with an electric motor of contacts mounted thereon to which the motor circuit is connected, a removable switch box secured to said motor, contacts mounted in said switch box, supply leads connected with the contacts in said switch box, the contacts in said switch box being adapted to engage with the contacts mounted upon the motor when the parts are assembled, and means upon the switch box and movable longitudinally of the motor axis for controlling the contacts.

11. The combination with an electric motor of contacts mounted thereon to which the motor circuit is connected, a removable switch box secured to said motor, contacts mounted in said switch box, supply leads connected with the contacts in said switch box, the contacts in said switch box being adapted to engage with the contacts mounted upon the motor when the parts are assembled, means mounted upon the switch box for controlling the contacts, and a handle secured to said switch box.

12. The combination with an electric motor having a hole in its yoke, of a switch box adapted to be secured to said yoke to cover said hole, contacts mounted within said motor and connected to the motor circuit, movable contacts mounted within said switch box and extending into an interpolar space of said motor, said movable contacts being adapted when the parts are assembled to engage with the contacts mounted upon the motor, means mounted upon the switch box for operating the movable contacts and supply leads connected with the contacts mounted in said switch box.

13. The combination with an electric motor having a hole in its yoke of a switch box adapted to be secured to said yoke to cover said hole, contacts mounted within said motor and connected to the motor circuit, movable contacts mounted within said switch box and extending into an interpolar space of said motor, said movable contacts being adapted when the parts are assembled to engage with the contacts mounted upon the motor, means mounted upon the switch box for operating the movable contacts and supply leads connected with the contacts mounted in said switch box and a handle upon said switch box.

14. The combination with an electric motor having a hole in its yoke, of a switch box adapted to be secured to said yoke to cover said hole, contacts mounted within said motor and connected to the motor circuit, movable contacts mounted within said switch box and extending into an interpolar space of said motor, said movable contacts being adapted when the parts are assembled to engage with the contacts mounted upon the motor, means mounted upon the switch box for operating the movable contacts and supply leads connected with the contacts mounted in said switch box, and a magnetic armature mechanically connected with said movable contacts, said armature being within the influence of the magnetism of the said motor.

15. The combination with an electric motor having a hole in its yoke, of a switch box adapted to be secured to said yoke to cover said hole, contacts mounted within said motor and connected to the motor circuit, movable contacts mounted within said switch box and extending into an interpolar space of said motor, said movable contacts being adapted when the parts are assembled to engage with the contacts mounted upon the motor, means mounted upon the switch box for operating the movable contacts, supply leads connected with the contacts mounted in said switch box, and a magnetic armature mechanically connected with said movable contacts, said armature being within the influence of the magnetism of the said armature and said movable contacts being within the magnetism of said motor so that arcs formed at the contacts will be blown out by the magnetism of the motor.

16. The combination with an electric motor having a terminal fixed thereon, of a removable device embodying a movable switch element, a conductor connected to said movable element and adapted to be connected to the supply circuit, and means controlled by the field of said motor coöperating with said movable element for maintaining said motor in closed circuit connection with the supply circuit.

17. A tool or appliance comprising in combination a motor; a switch element for controlling said motor removably mounted on a part of said motor, means for supporting the cable running to said switch element, and means for removably securing said switch element and said cable supporting means as a unit to said motor.

18. The combination with an electric device having an electromagnetic field element, said electric device having terminals fixed thereto, of a unitary removable element comprising a movable switch element, magnetic means controlled by said electromagnetic field element for maintaining said switch element in closed circuit position with said fixed terminals, and manual means for moving said switch element to open and closed positions.

19. In a tool, an electric motor, a casing for the same, terminals for the motor circuit, said terminals being located on said casing adjacent each other and on one side of the same, a switch element coöperating with said terminals, means for supporting the cable running to said switch element, and means for removably securing said switch element and said cable supporting means as a unit to said casing.

20. The combination with a portable electric device having an electromagnetic field element, said electric device having terminals fixed thereto, of a handle removably secured as a unit to said electric device, said handle comprising a movable switch element and a magnetic armature controlled by said electromagnetic field element for maintaining said movable switch element in closed circuit connection with said terminals, and manually operated means for moving said switch element to open and closed positions.

21. The combination with an electric motor, of a switch for controlling the same, said switch being carried by the field element of said motor, the movable contact element of said switch extending within an interpolar space of said motor and in such relation thereto that arcs formed at the contacts of said switch will be blown out by the magnetism of said motor.

22. The combination with an electric motor, of a switch for controlling the same, a contact of said switch being carried by the field element of the motor, and means for mounting the movable contact element of said switch so as to extend within an interpolar space of said motor and in such relation thereto that arcs formed at the contacts of said switch will be blown out by the magnetism of said motor.

In testimony whereof I affix my signature, in presence of two witnesses.

ELIE F. G. H. FAURE.

Witnesses:
 GEO. H. WINKLER, Jr.,
 C. H. SCHUM.